United States Patent
Zheng

(10) Patent No.: US 6,549,679 B1
(45) Date of Patent: Apr. 15, 2003

(54) AUTOMATED PICTURE MONTAGE METHOD AND APPARATUS

(75) Inventor: Juneng Zheng, Fremont, CA (US)

(73) Assignee: ArcSoft, Inc., Fremont, CA (US)

(*) Notice: Subject to any disclaimer, the term of this patent is extended or adjusted under 35 U.S.C. 154(b) by 0 days.

(21) Appl. No.: 09/394,115

(22) Filed: Sep. 10, 1999

Related U.S. Application Data

(60) Provisional application No. 60/099,769, filed on Sep. 10, 1998.

(51) Int. Cl.[7] .................................................. G06K 9/32
(52) U.S. Cl. ........................................ 382/284; 382/195
(58) Field of Search ................................ 382/294, 284, 382/305, 165, 173, 195; 395/135; 345/435

(56) References Cited

U.S. PATENT DOCUMENTS

| | | | |
|---|---|---|---|
| 5,611,033 A | * 3/1997 | Pitteloud et al. | ............ 395/135 |
| 5,649,032 A | * 7/1997 | Burt et al. | ................... 382/284 |
| 6,078,701 A | * 6/2000 | Hsu et al. | .................... 382/294 |
| 6,137,498 A | 10/2000 | Silvers | ........................ 345/435 |
| 6,229,931 B1 | * 5/2001 | Essafi et al. | ................ 382/305 |
| 6,246,804 B1 | * 6/2001 | Sato et al. | .................. 382/284 |
| 6,259,826 B1 | * 7/2001 | Pollard et al. | .............. 382/284 |
| 6,332,037 B1 | * 12/2001 | Zhu | ........................... 382/173 |

FOREIGN PATENT DOCUMENTS

| EP | 0 852 363 A2 | 7/1998 |
|---|---|---|
| EP | 0 935 217 A2 | 8/1999 |

OTHER PUBLICATIONS

"Photomosaics a new chapter in the history of mosacis", downloaded May 12, 2000 from <http://www.photomosaic.com/home.htm>, Runaway Technology, Inc.

"Photo Tiled Mosaics", downloaded May 12, 2000 from <http://www.infinite-image.net/>, Infinite Image (1999).

"Photo Montage", downloaded May 12, 2000 from <http://members.bellatlantic.net/~ebracr1/mont.html>, Photo Creations.

* cited by examiner

Primary Examiner—Jon Chang
Assistant Examiner—Brian Le
(74) Attorney, Agent, or Firm—Patent Law Group LLP; David C. Hsia

(57) ABSTRACT

An automated picture montage method (10) and associated apparatus computer system (12) for accepting an original image (40) and a picture database (28) for creating a montage image (58) from a plurality of pictures (46) to approximate the original image (40). In a pre-index database operation (36), the database (28) is indexed so as to minimize the computational power required. In order to maximize the quality of image, tile regions (42) are analyzed beginning at a center tile region (54) in an outward spiraling order of progression (48). In order to speed the process, analysis is accomplished in a first pass operation (44) and a second pass operation (50). Pictures in the picture database (28) are first selected based on the average color difference of the pictures and the tile region (42). A best match picture is found based on the RGB mean square difference between picture subregions and tile subregions.

6 Claims, 8 Drawing Sheets

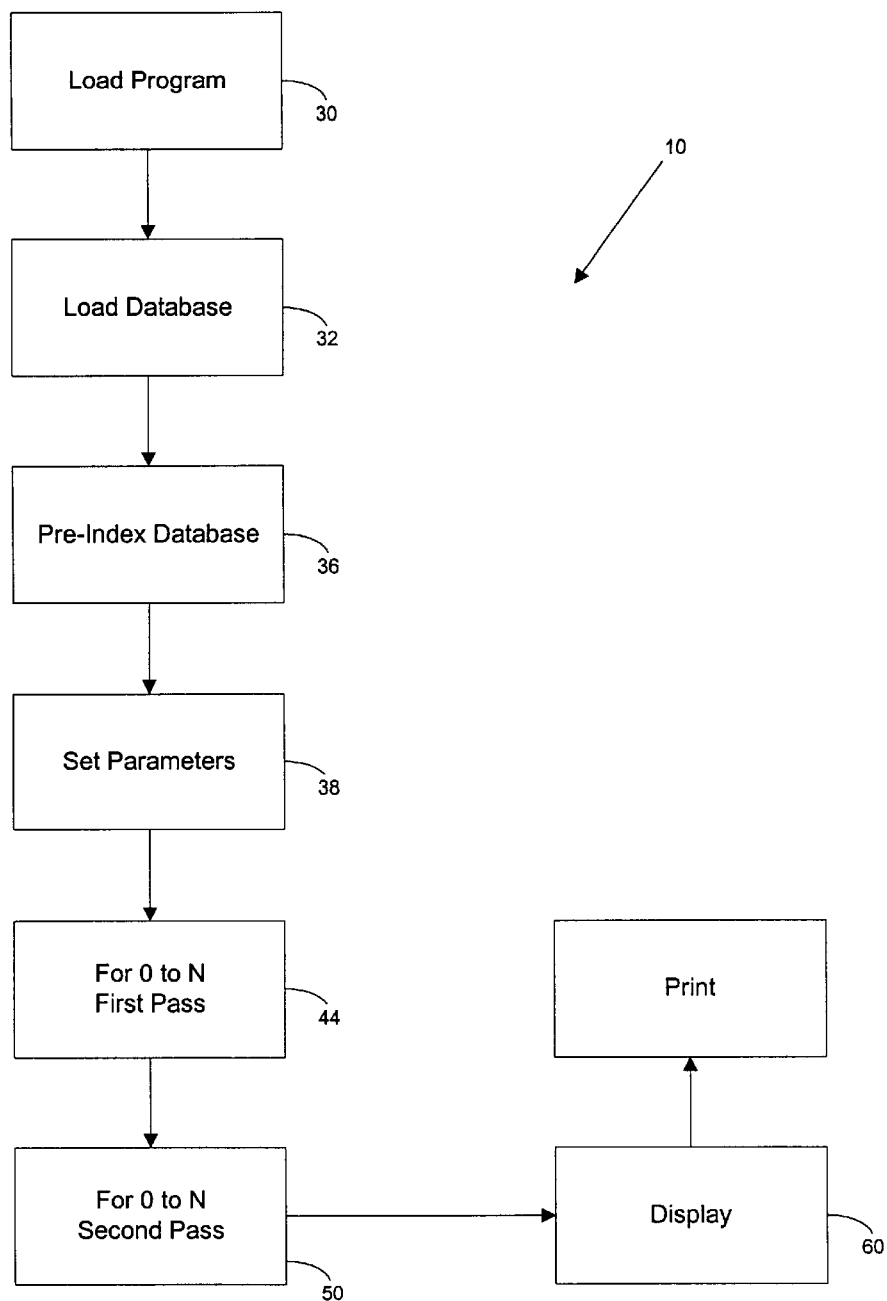

AUTOMATED PICTURE MONTAGE METHOD AND APPARATUS

This application claims the benefit of U.S. provisional application No. 60/099,769 filed Sep. 10, 1998.

TECHNICAL FIELD

The present invention relates to the field of digital image processing and more specifically to an automated method for creating a composite image from many smaller images. The predominant current usage of the present inventive automated picture montage method and apparatus is in the automated creation of modified pictures using commonly available desktop type computer systems, wherein it is desirable to accomplish this relatively complex task in a manner within the capabilities of such small computer systems.

BACKGROUND ART

Throughout the history of artistic visual representations, the variations of the artistic media and expression methods have been almost limitless. As just one example, the well known artist Georges Seurat was known to create complex pictures which, upon close inspection, were revealed to be composed entirely of small dots. A further refinement of this general method has been to create larger images from a great plurality of smaller images such that, as one views the work from a distance, the larger overall image is apparent. However, as one approaches the work, the smaller individual images become apparent. This is an example of a picture montage. In the well known process of producing a mosaic picture montage, pictures are selected to have the visual characteristics of the regions of a larger image for which the smaller pictures are to be substituted.

There exists at least one semi-automated system for creating a mosaic picture montage. Robert Silvers, a popular artist, has developed a system to assist in selecting pictures for use in a photomontage. Mr. Silvers' system produces excellent images and has been highly commercially and artistically successful. However, Mr. Silvers' system requires a computer having a larger storage capacity and greater computational speed than are commonly found in computers intended for home and small business use. Furthermore, Mr. Silvers' system is used as a tool to assist the artist, rather than as a method or apparatus for automatically producing a finished product.

To the inventor's knowledge, no method or apparatus has existed for automatically producing a picture montage. Furthermore, to the inventor's knowledge, no method or apparatus has existed for producing a picture montage which could acceptably be run on commonly available home computer systems, or the like.

DISCLOSURE OF INVENTION

Accordingly, it is an object of the present invention to provide a method and apparatus for automatically producing a picture montage.

It is still another object of the present invention to provide a method and apparatus for producing a picture montage that does not require operator intervention in the picture selection process.

It is yet another object of the present invention to provide a method and apparatus for producing a picture montage that can be used in conjunction with commonly available home computer systems.

It is still another object of the present invention to provide a method and apparatus for producing a picture montage that will produce the image quickly.

Briefly, the preferred embodiment of the present invention is a computer operable method for producing a picture montage. An original image is divided into a plurality of tile regions. Each of the tile regions is compared to a stored database of pictures to select a picture that is the best match for the associated tile region in average color content. According to the present invention, the image database is pre-indexed according to average general color characteristics. Analysis of the overall image begins at a middle region and moves in a spiral like pattern outward. This process has two passes. On a first, pictures with large average color differences are rejected. On a second pass, analysis of the subregions results in a best picture being selected from the non-rejected images.

An advantage of the present invention is that an attractive picture montage is produced.

A further advantage of the present invention is that the method can be accomplished using an inexpensive home computer.

Yet another advantage of the present invention is that a picture montage can be quickly produced.

Still another advantage of the present invention is that user intervention in the picture selection process is not required.

Yet another advantage of the present invention is that images closely matching associated tile regions are selected.

These and other objects and advantages of the present invention will become clear to those skilled in the art in view of the description of the embodiments of the invention and the industrial applicability as described herein and illustrated in the several figures of the drawing.

BRIEF DESCRIPTION OF THE DRAWINGS

FIGS. 1a–1e are flow diagrams of the automated picture montage method according to the present invention;

SUMMARY OF THE INVENTION

Figure 1B:
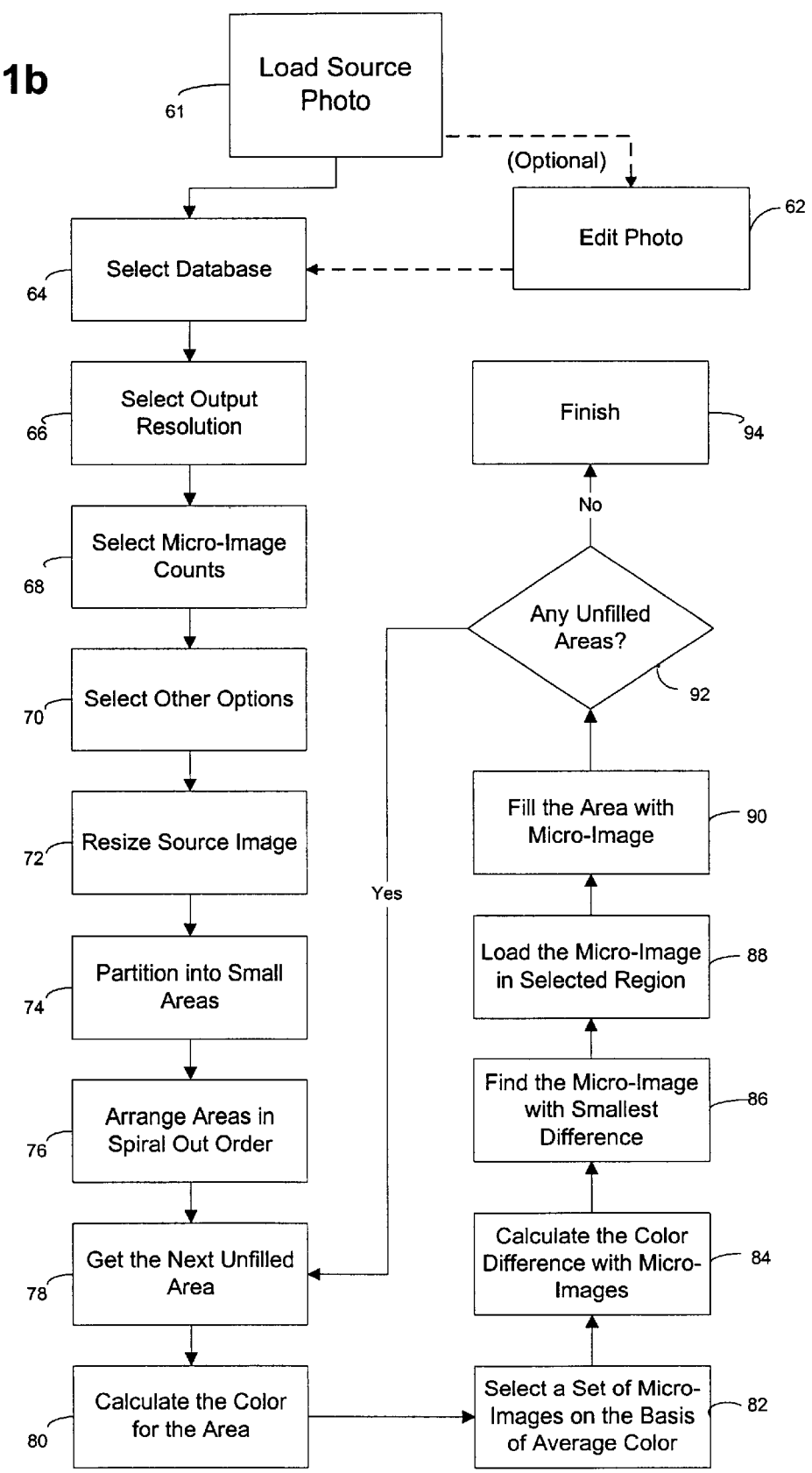

An automated picture montage method (10) and associated apparatus computer system (12) for accepting an original image (40) and a picture database (28) for creating a montage image (58) from a plurality of pictures (46) to approximate the original image (40). In a pre-index database operation (36), the database (28) is indexed so as to minimize the computational power required. In order to maximize the quality of image, tile regions (42) are analyzed beginning at a center tile region (54) in an outward spiraling order of progression (48). In order to speed the process, analysis is accomplished in a first pass operation (44) and a second pass operation (50). Pictures in the picture database (28) are first selected based on the average color difference of the pictures and the tile region (42). A best match picture is found based on the RGB mean square difference between picture subregions and tile subregions.

BEST MODE FOR CARRYING OUT INVENTION

The best presently known mode for carrying out the invention is a computer program, operative on a general-purpose computer, for accomplishing an automated picture montage method. The inventive automated picture montage method is depicted in a flow diagram in FIG. 1a and is designated therein by the general reference character 10. FIG. 2 is a block diagram of a computer system 12 such as is anticipated to be used to accomplish the automated picture montage method 10. Illustrated is computer enclosure 14 (containing a CPU, memory, bus, I/O ports, power supply, and add-on boards) having the usual appendages such as a keyboard 16, a pointing device 18 (generally a mouse), a display screen 20, a printer 21, removable media such as a CD ROM 22a, floppy disk 22b, or magnetic tape (not shown) for use in a removable media driver 24, and a fixed media drive 26. The inventive automated picture montage method 10 will generally be stored upon removable media for downloading into the fixed media drive 26 of the computer system 12. In addition, a picture database 28 consisting of a plurality (the quantity of which to be discussed hereinafter) of pictures, will be stored on the fixed media 26 via the removable media drive 24 from an iteration of the removable media.

The automated picture montage method 10 is accomplished in steps generally as follows: In a load program operation 30, executable code for accomplishing the automated picture montage method 10 is loaded from an iteration of the removable media 22 into the fixed media 26 for execution by the CPU in enclosure 14. In a load database operation 32, a picture database 28 is loaded from an iteration of the removable media 22 into the fixed media 26. In the present example, the picture database 28 has 10,000 individual pictures, although it is anticipated that a larger quantity will be desirable to produce a higher quality product. It should be noted that the methods described herein for getting the automated picture montage method 10 software and the picture database 28 into the computer system 12 are provided by way of example only. Essentially any alternative method of accomplishing the stated goals would suffice for operations 30 and 32.

Figure 4:
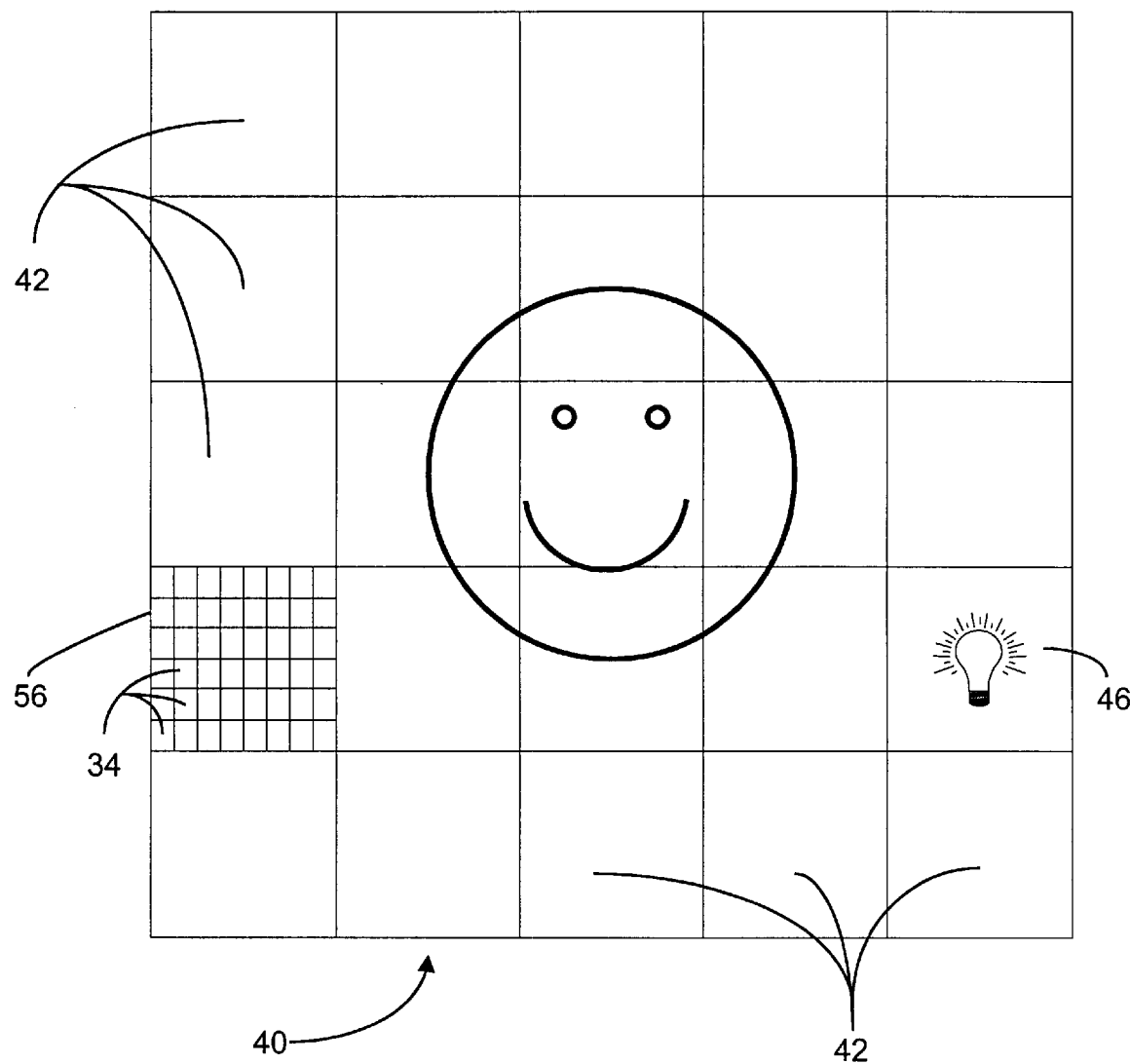
FIG. 4 is an example of the image of FIG. 3 divided into a plurality of tile regions.

In view of FIG. 2, the picture database 28, which is stored on the fixed media 26, is pre-indexed based on the average color content of its respective picture subregions 34 (FIG. 4). This is accomplished in a pre-index database operation 36, as depicted in FIG. 1a. It should be noted that it is within the scope of the invention that the picture database 28 is provided to the computer system 12 in pre-indexed form. In such an example, the pre-indexed database operation 36 would precede in order all other operations in the flow diagram of FIG. 1. In the embodiment described, software for accomplishing this operation is included in the software provided with the automated picture montage method 10 such that an end user can pre-index a picture database other than one provided by the supplier of the software. In the pre-index database operation 36, a database index 37 (FIG. 2) is created for allowing the CPU in enclosure 14 to quickly compare picture subregions 34 to select the appropriate micro-image picture from the database 28. The database index 37 is simply an index of the pictures in the database 28 containing the average RGB values of eight wide by six high subregions 34 of each of the pictures in the database 28. The images in the database 28 are resized to a standard size and stored in compressed format in the database 28.

Figure 3:
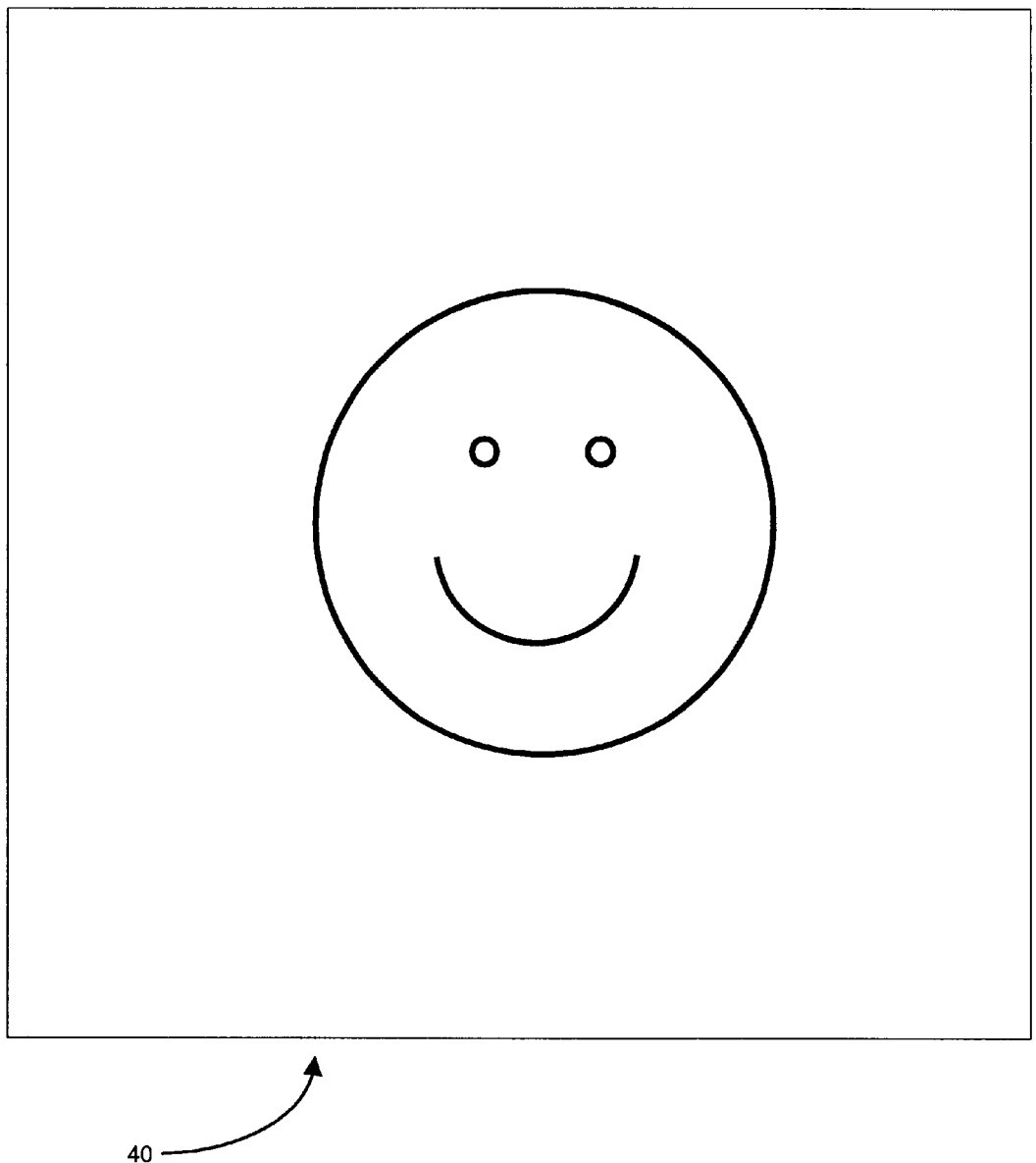
FIG. 3 is an original image such as might be operated upon according to the present inventive method.

FIG. 3 is a simplified diagram of an original image 40, which is the picture that the entire overall end product is intended to represent, as might be represented on the screen 20 of the computer system. FIG. 4 shows the original image 40 divided into a plurality (twenty five in this simplified example) of tile regions 42. It should be noted that this simple example is being used in order to better illustrate the invention. In practice, the quantity of tile regions 42 may vary from 600 to 1600 or more.

According to the present example, in a set parameters operation 38 (FIG. 1a), an end user will select how many of the tile regions 42 into which the original image 40 will be divided. The end user will also typically be allowed to select the size (in pixels or equivalent) of each of the tile regions 42. One skilled in the art will recognize that the overall size of a resulting picture montage file will be a function of the size and the quantity of the tile regions 42.

In a first pass operation 44, for each of the tile regions 42, according to the present inventive method, an average RGB square difference value is calculated for each of the regions 42 as compared to values stored in the index 37. Images from the database 28 with minimal RGB square difference values are then selected as possible candidates while images with high difference values are rejected.

Figure 5:
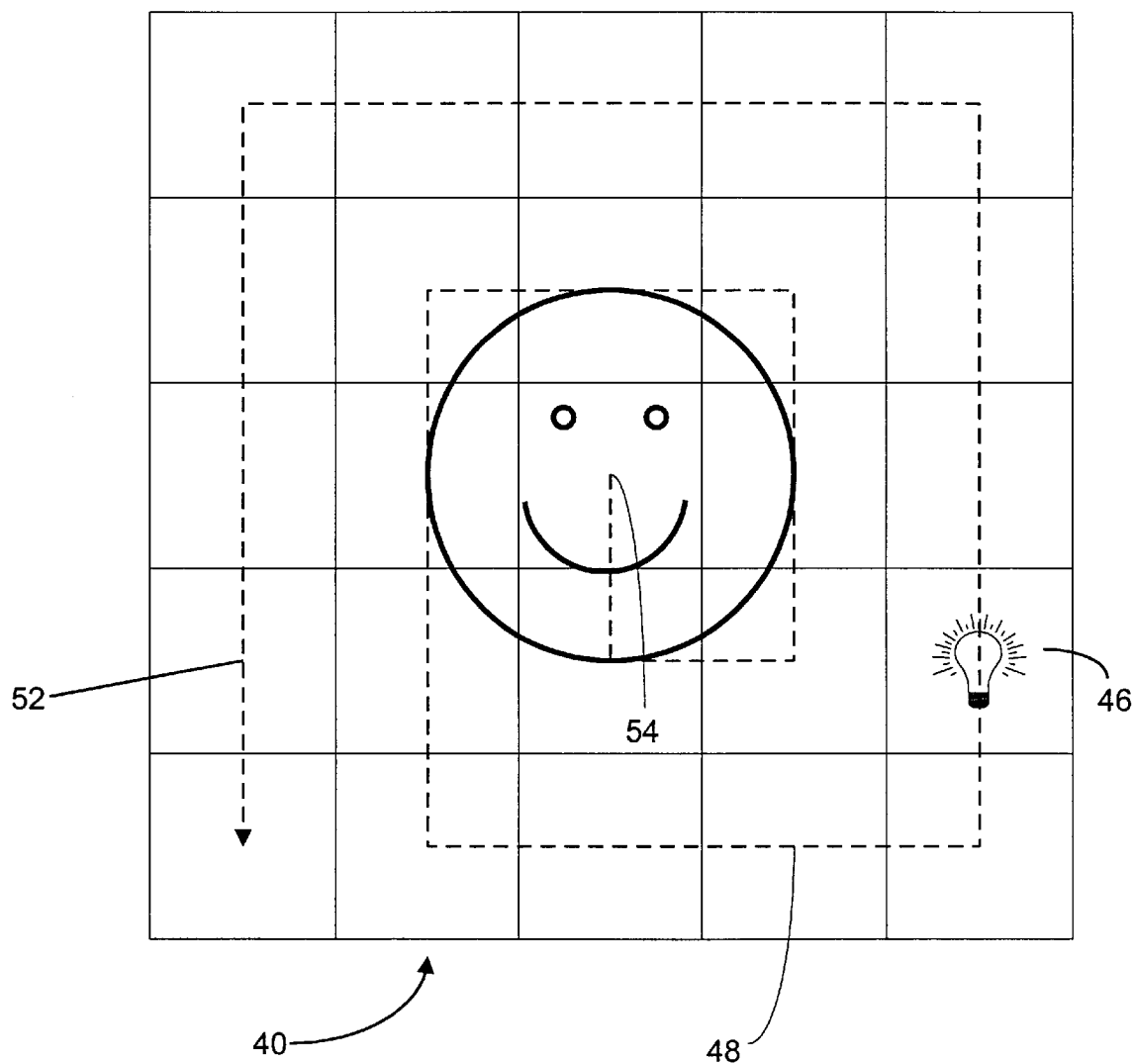
FIG. 5 is a representation of the image of FIG. 4 showing a progression of operations upon the tile regions.

FIG. 5 is an example of the divided original image showing an order of progression of the analysis of the tile regions 42 in the first pass operation 44 and in a subsequent second pass operation 50 (FIG. 1). A progression arrow 52 is shown, for purposes of example only, superimposed on the tile regions 42 in FIG. 5. According to this example of the present inventive method, beginning at a center tile region 54, analysis of the tile regions 42 will progress outward in a general spiral pattern, as depicted by the arrow 52.

In the second pass operation 50, for each of the tile regions 42, according to the present inventive method, an average RGB mean square difference is calculated for each of a plurality of subregions 34 and each of the tile regions 42. In the illustrated embodiment of the present inventive automated picture montage method 10, each of the tile regions 42 is divided into forty eight (eight wide by six tall) subregions 34. One skilled in the art will recognize that the method for calculating RGB mean square differences is defined as being:

$$(R_1-R_2)^2+(G_1-G_2)^2+(B_1-B_2)^2$$

where $R_1$ is the red value for a first area to be compared, $R_2$ is the red value for a second area to be compared, $G_1$ is the green value for the first area to be compared, $G_2$ is the green value for the second area to be compared, and $B_1$ is the blue value for the first area to be compared, $B_2$ is the blue value for the second area to be compared.

Figure 6:
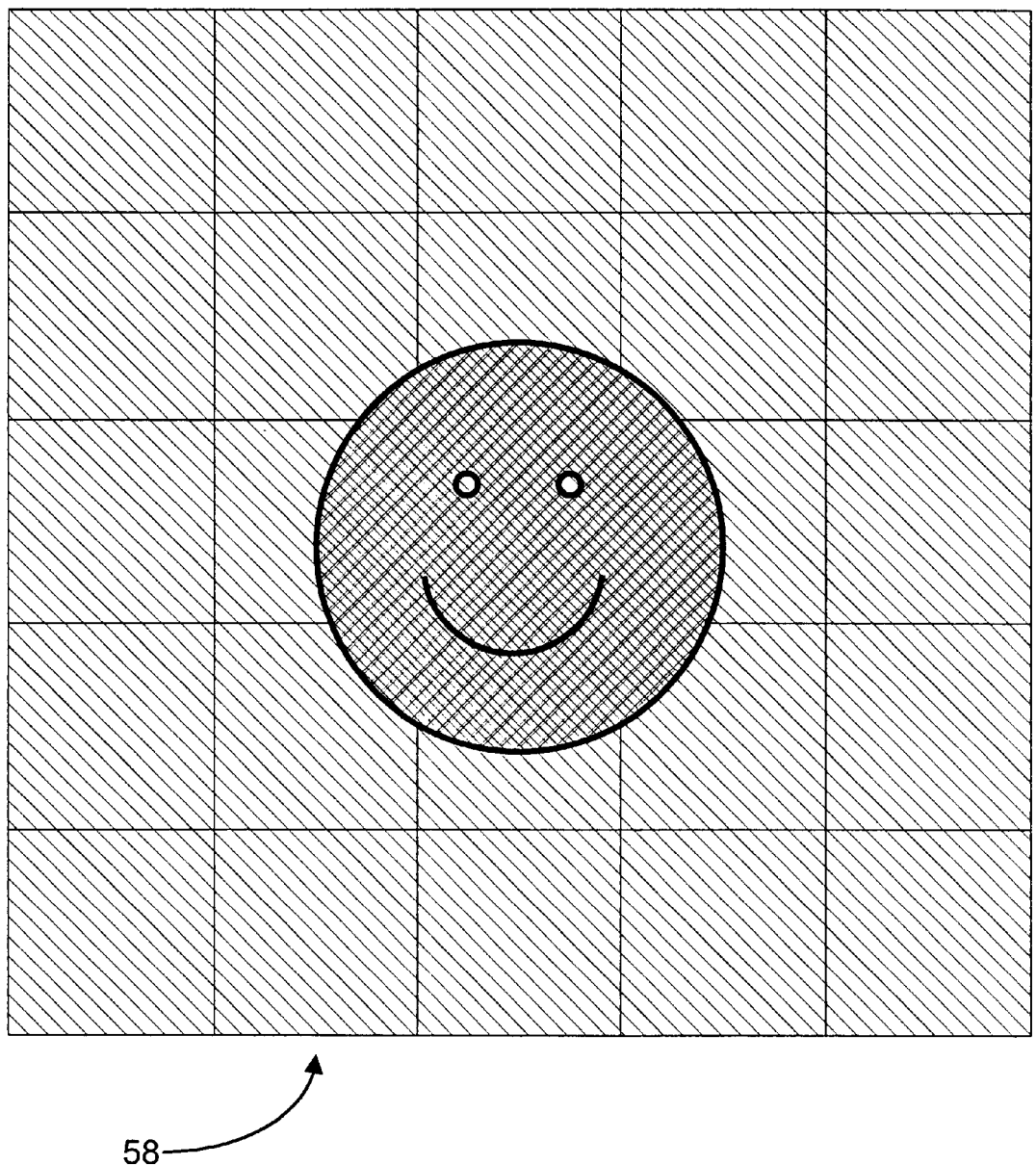
FIG. 6 is a resultant image, according to the present inventive method and apparatus.

The pictures with the best matches to the tile regions 42 are loaded into system memory from the picture database 28, and the composite montage image 58 is created as described above. The montage image 58, as depicted by way of example in FIG. 6, is displayed on the screen 20 (FIG. 2) of the computer system 12 in a display montage image operation 60. Finally, upon command from the end user, if desired the printer 21 (FIG. 2) will print out the montage image 58 (FIG. 6).

Figure 2:
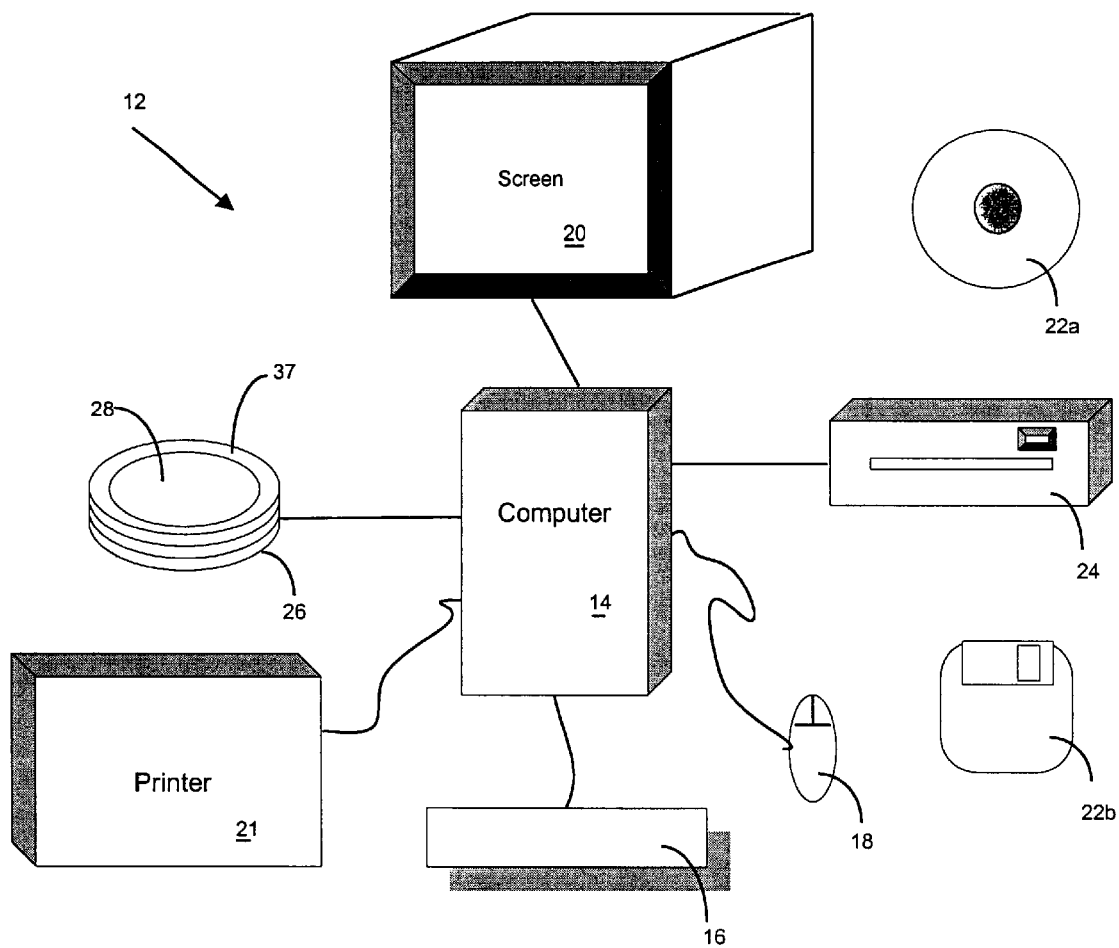
FIG. 2 is a block diagram of a computer system such as might be used to accomplish the present inventive method.

FIG. 1b provides additional detail on the division and fill of original image 40 with micro-image pictures 46. Upon the partition 74 of the original image 40 into tile regions 42 and subregions 34, the areas are examined in outward spiraling progression 48. This spiral out order 76 determines the next area 78 to be filled. The color value of the original source image is calculated 80, and, based on the average color, a set of micro-images are selected 82. Once the micro-image with the smallest color difference is selected 86, it is loaded 88 into the area selected at step 78. This area is filled 90 and the next unfilled area is selected for examination 92.

Figure 1C:
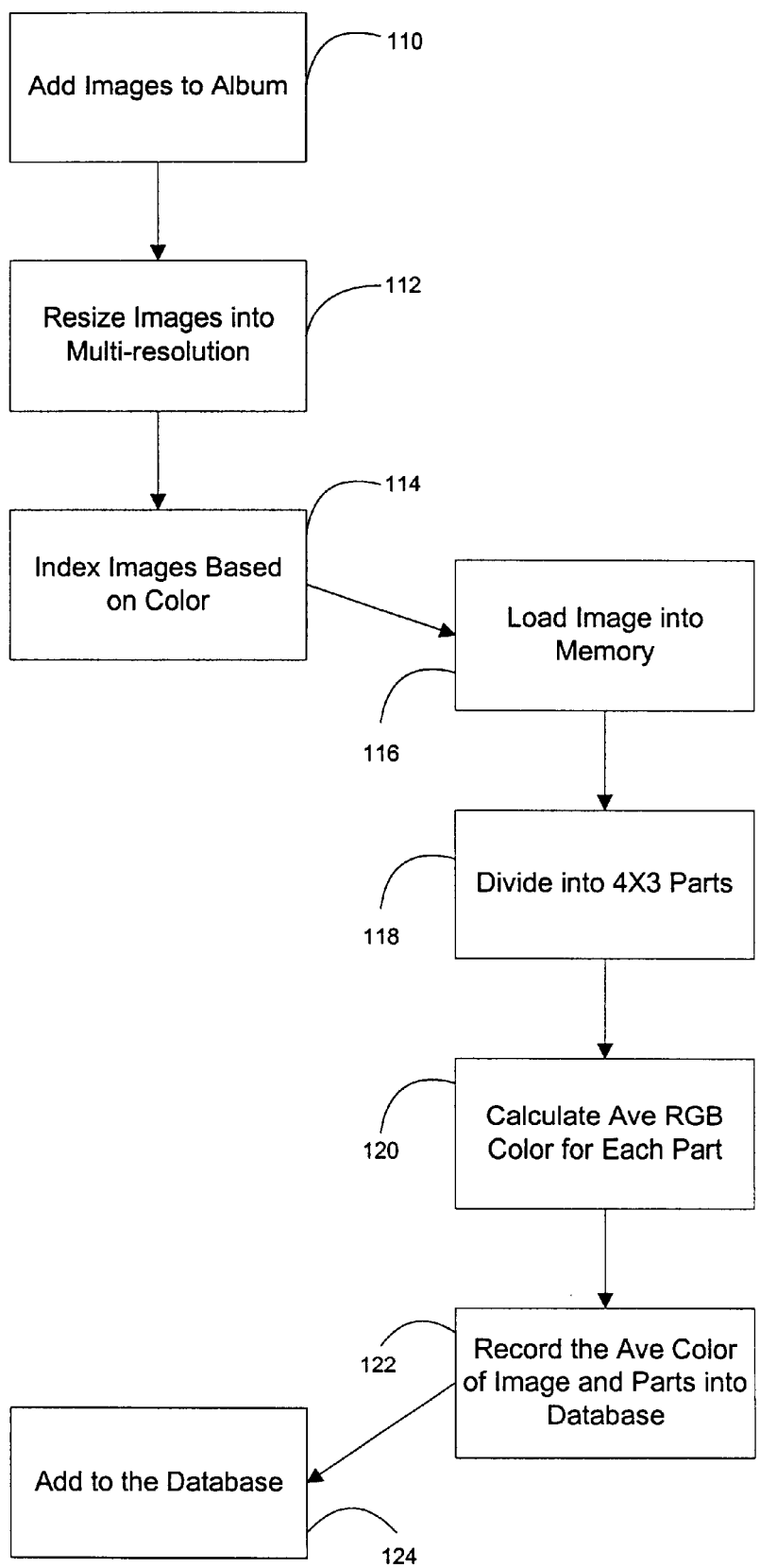

FIG. 1c provides additional detail on building and adding micro-images to database 26. After resizing images as necessary 112, the images are indexed according to color 114. The indexing steps include loading an image into memory 116, dividing the image into 4×3 (12) parts 118, calculating the average RGB color for each of the 12 parts 120, and recording the average color of the images and the parts into the database 112. Then the information is added to the database for retrieval when a mosaic image 58 is to be built.

A variation of the rendering process, for picking a best-matched picture 46 from database 28 for filling subregions 34 and/or tile regions 42, may be implemented as follows: Photo Montage™

Photo Montage™ PC software automatically produces a high-resolution poster size digital image made up of thousands of smaller photos based on a low-resolution portrait captured from digital camera or scanner in just minutes.

The Photo Montage™ rendering algorithm picks a best-matched image from the database of ten thousands photos for each small block in the portrait. The optimized algorithm makes it possible for PC to recognize the image detail characteristics and search for a best-matched image from the fully customizable and extendable database in a short time.

Photo Montage™ Algorithm Details

1. CreatePhotoMontageDatabase( );
2. LoadPhotoMontageDatabase( );
3. FindBestMatchtImage( );
4. ProcessPhotoMontageImage( );

The following source code is from Photo Montage™ software:

```
HANDLE LoadPhotoMontageDatabase( void )
{
HFILE hFile;
OFSTRUCT ofs;
MONTAGEFILEHEADER pmHd;
LPBYTE lpt;
long lsize;
SetCursor(LoadCursor(NULL, IDC_WAIT));
if( (hFile = OpenFile ( szMontageFile, &ofs, OF_READ)) == -1
)
    {
        SetCursor(LoadCursor(NULL, IDC_ARROW));
        return NULL;
    }
    if(_lread( hFile, (LPSTR)&pmHd, sizeof(pmHd)) !=
sizeof(pmHd) ||
            MONTAGE_FILE_TYPE != pmHd.dwType )
    {
        _lclose (hFile);
        SetCursor(LoadCursor(NULL, IDC_ARROW));
        return NULL;
    }
    lsize = pmHd.dwNum;
    hMontageData = PDGlobalAlloc( lsize );
    if( !hMontageData )
    {
        _lclose (hFile);
        SetCursor(LoadCursor(NULL, IDC_ARROW));
        return FALSE;
    }
    lpt = (LPBYTE)GlobalLock( hMontageData );
    lread( hFile, lpt, lsize );
    GlobalUnlock( hMontageData );
    _lclose (hFile);
    SetCursor(LoadCursor(NULL, IDC_ARROW));
    return hMontageData;
}
LONG FindBestMatchImage ( LPBYTE lpData, long Tot,
LPBYTE lpInfo )
{
    .............
    for( i = Offset = 0; i < Tot; i++ )
    {
        lpmhdr = (LPMONTAGEDATAHEADER)(lpData + Offset);
        Offset += MONTAGE_SIZE;
        Flag = lpmhdr->dwFlags;
        if( nUsage >= Flag ) // not over used
        {
        Diff = ( Flag * Diff0 ) >> 8;
        lpVal = (LPBYTE)lpmhdr + MONTAGE_SIZE;
        lpT = lpInfo;
        for( j = 0; j < Tot; j++ )
        {
```

-continued

```
            if( *(lpT++) == 0 )
            {
                lpVal += 3;
                lpT += 3;
            }
            else
            {
                nB = (long)*(lpVal++) - (long)*(lpT++);
                nG = (long)*(lpVal++) - (long)*(lpT++);
                nR = (long)*(lpVal++) - (long)*(lpT++);
                Diff += abs( nR ) + abs( nG ) + abs( nB );
                if( Diff >= Min )
                    break;
            }
        }
        if( Diff < Min )
        {
            Pos = i;
            Min = Diff;
        }
    }
    lpmhdr = (LPMONTAGEDATAHEADER)(lpData + Pos * MONTAGE_SIZE );
    lpmhdr->dwFlags += 1; // add the usage flag
    Pos = lpmhdr->dwFileNum;
    return Pos;
}
HANDLE ProcessPhotoMontageImage( HANDLE hDib )
{
.................
□
LoadPhotoMontageDatabase( );
for( nL = nLev-1; nL >= 0; nL-- )
{
    nTot = 2 * ( W0 + H0 - 4 * nL - 2 );
    for( nT = nTot-1; nT >= 0; nT-- )
    {
        if( nT <= W0-2*nL-1 )
        {
            x0 = nL+nT;
            y0 = nL;
        }
        else if( nT <= H0 + W0 - 4 * nL - 2 )
        {
            x0 = W0-nL-1;
            y0 = 3*nL+1+nT-W0;
        }
        else if( nT <= H0 + 2 * W0 - 6 * nL - 3 )
        {
            x0 = H0+2*W0-5*nL-3-nT;
            y0 = H0-nL-1;
        }
        else
        {
            x0 = nL;
            y0 = 2*H0+2*W0-7*nL-4-nT;
        }
        Ct++;
        nPos = 0;
        for( j = 0; j < GRID_H; j++ )
        {
        nAddr = (j+y0*GRID_H)*LineByte + 3 * x0 * GRID_W;
        for( i = 0; i < GRID_W; i++ )
        {
            TabV [nPos++] = 1; // always set the flag
            TabV [nPos++] = *(lpt+(nAddr++));
            TabV [nPos++] = *(lpt+(nAddr++));
            TabV [nPos++] = *(lpt+(nAddr++));
        }
        }
        nPos = FindBestMatchObject( lpData, nMontageNum, TabV );
        *(lpPos+x0+y0*W0) = nPos;
    }
}
Ct = 0;
for( j = 0; j < H0; j++ )
{
```

```
        for( i = 0; i < W0; i++ )
        {
            Ct++;
            nPos = *(lpPos+i+j*W0);
            hDibS = FindBestMatchImage ( nPos, FALSE );
            FillMontageImageBlock( hDibS, i, j, lptN, NewW );
        }
    }
return hDibN;
}
```

Various modifications may be made to the invention without altering its value or scope. For example, different quantities of tile regions 42 could be selected. Yet another likely modification would be to provide a larger quantity of pictures in the database 28. Still another likely modification would be to use a YUV color space and/or a color comparison method other than mean square difference.

The above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The inventive automated picture montage method 10 is intended to be widely used for inexpensively and quickly creating picture montage/mosaic images for amusement and for business purposes. Since the inventive method can be accomplished using inexpensive and commonly available consumer computer systems, and since no particular skill or significant operator intervention is required, it is anticipated that the inventive automated picture montage method 10 will be widely accepted for both home and business use.

Since the automated picture montage method 10 of the present invention may be readily produced and integrated into existing computer systems and devices, and since the advantages as described herein are provided, it is expected that it will be readily accepted in the industry. For these and other reasons, it is expected that the utility and industrial applicability of the invention will be both significant in scope and long lasting in duration.

I claim:

1. A computer method for creating a mosaic image of an original image from a plurality of micro-images, comprising:

(1) dividing the original image into a plurality of tile regions;

(2) calculating the average color of one of the tile regions;

(3) selecting a group of the micro-images that possibly match the one tile region by comparing the average color of the one tile region and the average color of each micro-image, wherein the average color of each micro-image is stored in a database;

(4) dividing the one tile region into a plurality of subregions and calculating the average color of each subregion;

(5) selecting one micro-image from the group that matches the one tile region by comparing the average colors of the subregions of the one tile region and the average colors of corresponding subregions of each micro-image, wherein the average colors of the corresponding subregions of each micro-image are stored in the database;

(6) filling the one tile region with the one micro-image;

(7) repeating actions (1) to (6) for each of the remaining tile regions.

2. The method of claim 1, further comprising:

(1) calculating the average color of one of the micro-images;

(2) dividing the one micro-image into a plurality of subregions and calculating the average color of each subregion;

(3) storing the average color of the one micro-image and the average color of each subregion of the one micro-image in the database;

(4) repeating actions (1) to (3) for each of the remaining micro-images.

3. The method of claim 1, wherein said comparing the average color of the one tile region and the average color of each micro-image comprises calculating a square difference between the average color of the one tile region and the average color of each micro-image.

4. The method of claim 3, wherein said selecting a group of the micro-images comprises selecting the group of the micro-images having square differences less than a predetermined threshold.

5. The method of claim 1, wherein said comparing the average colors of the subregions of the one tile region and the average colors of corresponding subregions of each micro-image comprises calculating a mean square difference between the average colors of the subregions of the one tile region and the average colors of the corresponding subregions of each micro-image.

6. The method of claim 5, wherein said selecting one micro-image from the group comprises selecting the one micro-image having the smallest mean square difference.

* * * * *